(12) United States Patent
Zhou et al.

(10) Patent No.: US 7,663,623 B2
(45) Date of Patent: Feb. 16, 2010

(54) SPHERICAL HARMONICS SCALING

(75) Inventors: Kun Zhou, Beijing (CN); Jiaping Wang, Beijing (CN); Stephen Lin, Beijing (CN); Baining Guo, Beijing (CN)

(73) Assignee: Microsoft Corporation, Redmond, WA (US)

( * ) Notice: Subject to any disclaimer, the term of this patent is extended or adjusted under 35 U.S.C. 154(b) by 473 days.

(21) Appl. No.: 11/612,394

(22) Filed: Dec. 18, 2006

(65) Prior Publication Data

US 2008/0143719 A1    Jun. 19, 2008

(51) Int. Cl.
*G06T 15/50* (2006.01)
*G06T 15/00* (2006.01)

(52) U.S. Cl. ...................... 345/426; 345/419
(58) Field of Classification Search ........................ None
See application file for complete search history.

(56) References Cited

U.S. PATENT DOCUMENTS

| | | | |
|---|---|---|---|
| 6,853,745 | B1 | 2/2005 | Jacobs et al. |
| 7,061,489 | B2 | 6/2006 | Snyder et al. |
| 2003/0179197 | A1 | 9/2003 | Sloan et al. |
| 2005/0035965 | A1 | 2/2005 | Sloan et al. |
| 2005/0041023 | A1 | 2/2005 | Green et al. |
| 2005/0041024 | A1 | 2/2005 | Green et al. |
| 2005/0080602 | A1 | 4/2005 | Snyder et al. |
| 2005/0083340 | A1 | 4/2005 | Sloan et al. |
| 2005/0276441 | A1 | 12/2005 | Debevec |
| 2006/0120580 | A1 | 6/2006 | Makram-Ebeid et al. |
| 2006/0132486 | A1 | 6/2006 | Kim et al. |
| 2006/0214931 | A1 | 9/2006 | Snyder et al. |
| 2007/0257913 | A1* | 11/2007 | Sloan et al. ................. 345/426 |
| 2008/0001947 | A1* | 1/2008 | Snyder et al. ............... 345/426 |

OTHER PUBLICATIONS

Kazhdan, M., Funkhouser, T., and Rusinkiewicz, S. 2003. Rotation invariant spherical harmonic representation of 3D shape descriptors. In Proceedings of the 2003 Eurographics/ACM SIGGRAPH Symposium on Geometry Processing (Aachen, Germany, Jun. 23-25, 2003). ACM International Conference Proceeding Series, vol. 43. Eurographics Association.*
Zhou, K., Hu, Y., Lin, S., Guo, B., and Shum, H. 2005. Precomputed shadow fields for dynamic scenes. In ACM SIGGRAPH 2005 Papers (Los Angeles, California, Jul. 31-Aug. 4, 2005). J. Marks, Ed. SIGGRAPH '05. ACM, New York, NY, 1196-1201. DOI= http://doi.acm.org/10.1145/1186822.1073332.*

(Continued)

*Primary Examiner*—Ulka Chauhan
*Assistant Examiner*—Daniel F Hajnik
(74) *Attorney, Agent, or Firm*—Lee & Hayes, PLLC

(57) ABSTRACT

A method, device and system is provided for providing global illumination of a scene. For example, global illumination may be provided in a rendered 3-dimensional image that may contain objects and/or light sources. Radiance functions or visibility functions may further be represented by scaling of spherical harmonics functions in the spherical harmonics domain. For example, scaling of spherical harmonics coefficients corresponding to a spherical function may be performed based on a spherical harmonics scaling transformation matrix based on an angular scaling function.

15 Claims, 12 Drawing Sheets

OTHER PUBLICATIONS

Annen, T., Kautz, J., Durand, F., and Seidel, H. 2004. Spherical harmonic gradients. In ACM SIGGRAPH 2004 Sketches (Los Angeles, California, Aug. 8-12, 2004). R. Barzel, Ed. SIGGRAPH '04. ACM, New York, NY, 110. DOI= http://doi.acm.org/10.1145/1186223.1186361.*

S. Erturk et al. "3D model representation using spherical harmonics", Electronic Letters, May 22, 2997, vol. 33, No. 11.

Peter-Pike Sloan et al. "Precomputed Radiance Transfer for Real-Time Rendering in Dynamic, Low-Frequency Lighting Environments", Proceedings of the 29th annual conference on Computer graphics and interactive techniques, 2002, pp. 638-647.

Jan Kautz et al. "Fast, Arbitrary BRDF Shading for Low-Frequency Lighting Using Spherical Harmonics", ACM International Conference Proceeding Series; vol. 28, Proceedings of the 13th Eurographics workshop on Rendering, 2002.

Yanlin Weng et al. "2D Shape Deformation Using Nonlinear Least Squares Optimization", The Visual Computer: International Journal of Computer Graphics, Sep. 2006, vol. 22, Issue 9.

Jiaping Wang et al. "Spherical Harmonics Scaling", The Visual Computer: International Journal of Computer Graphics, Sep. 2006, vol. 22, Issue 9.

* cited by examiner

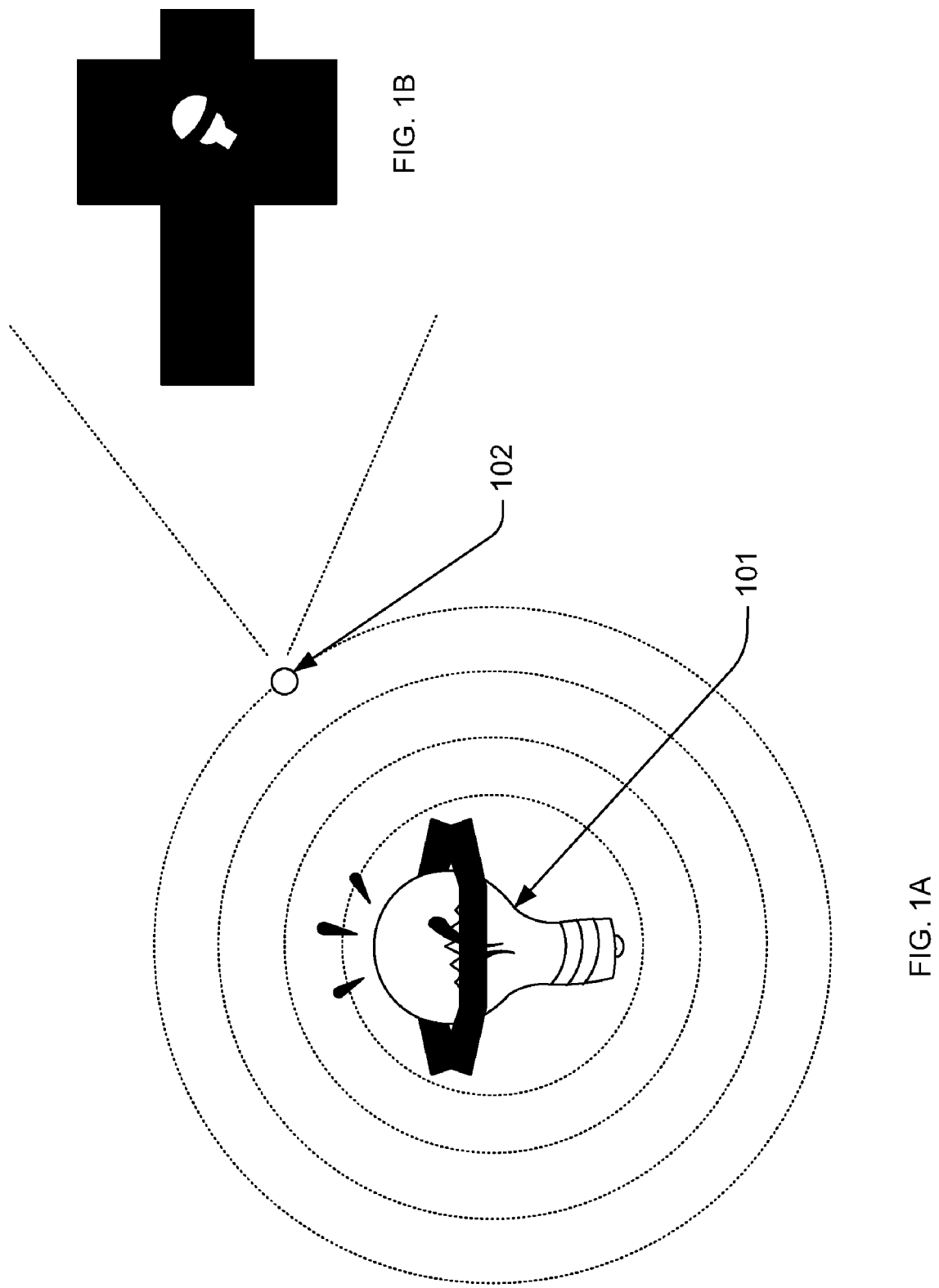

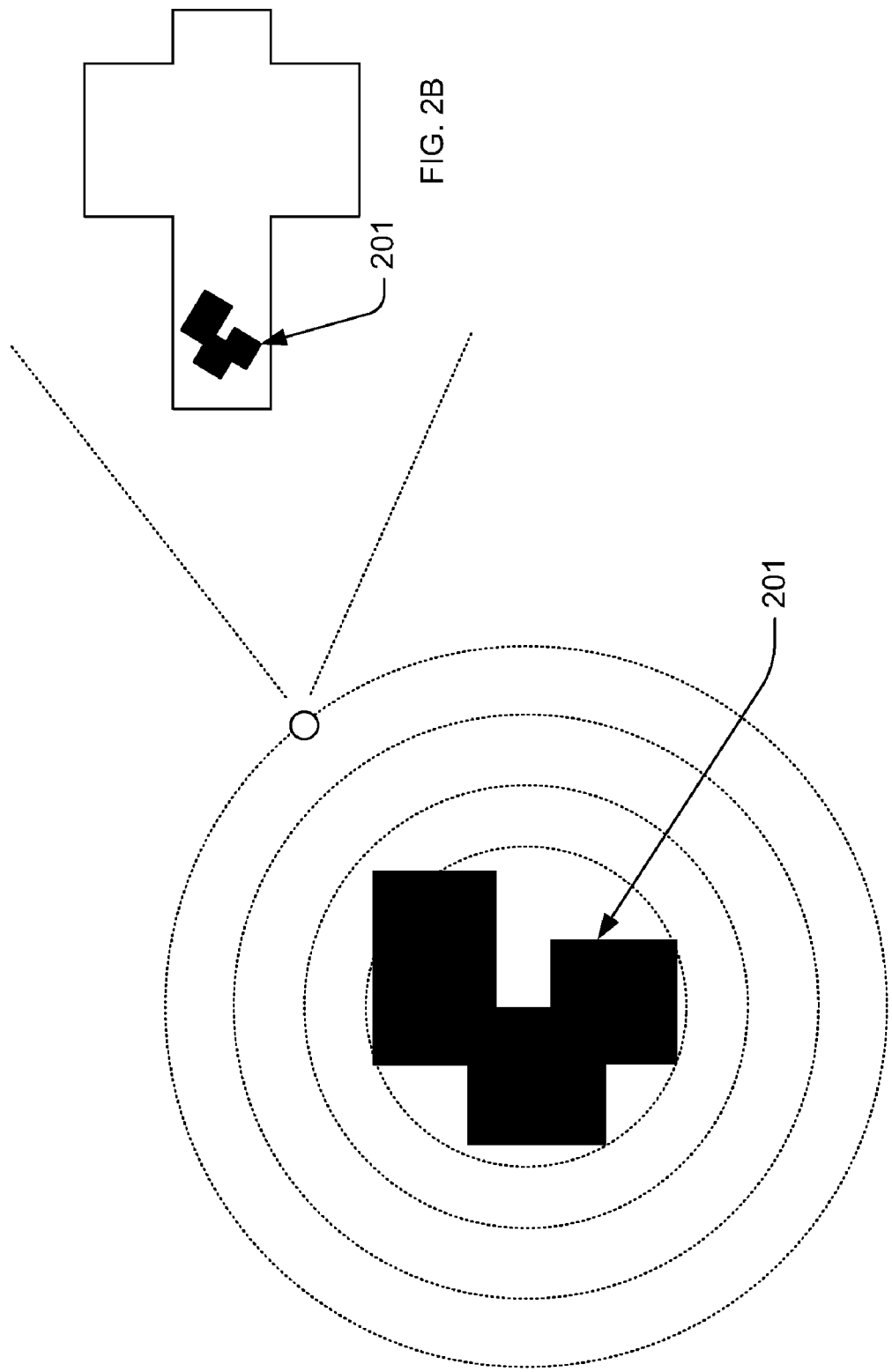

Spherical harmonics projection

SPHERICAL HARMONICS SCALING

BACKGROUND

Realistic rendering of computer-generated images has become increasingly important in a variety of areas including, for example, graphic design, illustration, video games, and the like. 3-dimensional computer-generated images of environments typically include a source of light and resulting lighting and shadow effects on objects in the scene. Such global illumination effects often require a large amount of computation from the computer system. This may take long periods of time and an abundance of resources. Typically, such computations can be costly and/or inefficient. Despite recent interest in the areas of simulating global illumination effects in 3-dimensional computer generated scenes, no method or system has been devised that can perform the computations in an efficient manner while providing realistic illumination effects in a generated scene.

Thus, there is a need for a method or system in which global illumination effects may be efficiently and effectively rendered in a scene such as a computer-generated environment.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one example, a method is provided for scaling a spherical harmonics function. In one example, a spherical function is received and converted into a spherical harmonics representation. Scaling may be performed based on a matrix-vector product between a vector having coordinates corresponding to the spherical harmonics representation and a spherical harmonics scaling transformation matrix.

In another example, a system is described containing an input and a processor. The input may receive a spherical function and the processor may convert the spherical function into a vector of spherical harmonics coefficients and scale the spherical function in a spherical harmonics domain based on a matrix-vector product.

In yet another example, a computer-readable medium is described containing computer-executable code for scaling a spherical function in a spherical harmonics domain.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIGS. 1A and 1B illustrate an example of a light source and corresponding source radiance fields (SRF).

FIGS. 2A and 2B illustrate an example of an object occlusion field (OOF) associated with an object in a scene.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 12:
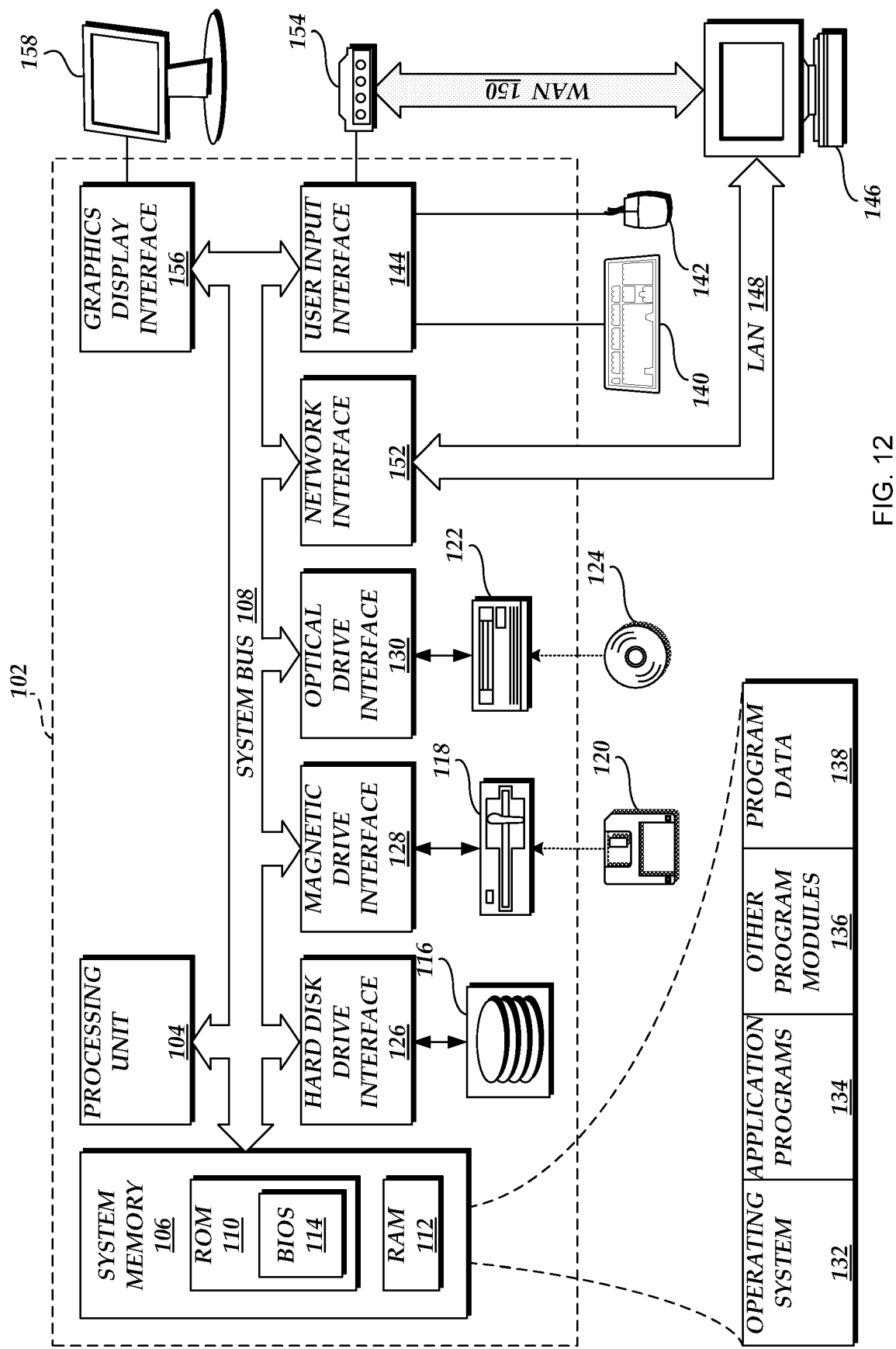
FIG. 12 is a block diagram representing an exemplary computer system into which spherical harmonics scaling may be incorporated.

FIG. 12 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 12, an exemplary system for implementing the invention includes a general purpose computing device in the form of a computer 102. Components of computer 102 may include, but are not limited to, a processing unit 104, a system memory 106, and a system bus 108 that couples various system components including the system memory to the processing unit 104. The system bus 108 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 102 typically includes a variety of computer readable media. Computer readable media can be any available media that can be accessed by computer 102 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 102. Combinations of the any of the above should also be included within the scope of computer readable storage media.

The system memory 106 includes computer storage media in the form of volatile and/or nonvolatile memory such as read only memory (ROM) 110 and random access memory (RAM) 112. A basic input/output system 114 (BIOS), containing the basic routines that help to transfer information between elements within computer 102, such as during start-up, is typically stored in ROM 110. RAM 112 typically contains data and/or program modules that are immediately accessible to and/or presently being operated on by processing unit 104. By way of example, and not limitation, FIG. 12 illustrates operating system 132, application programs 134, other program modules 136, and program data 138.

The computer 102 may also include other removable/non-removable, volatile/nonvolatile computer storage media. By way of example only, FIG. 12 illustrates a hard disk drive 116 that reads from or writes to non-removable, nonvolatile magnetic media, a magnetic disk drive 118 that reads from or writes to a removable, nonvolatile magnetic disk 120, and an optical disk drive 122 that reads from or writes to a removable, nonvolatile optical disk 124 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 116 is typically connected to the system bus 108 through an non-removable memory interface such as interface 126, and magnetic disk drive 118 and optical disk drive 122 are typically connected to the system bus 108 by a removable memory interface, such as interface 128 or 130.

The drives and their associated computer storage media discussed above and illustrated in FIG. 12, provide storage of computer readable instructions, data structures, program modules and other data for the computer 102. In FIG. 12, for example, hard disk drive 116 is illustrated as storing operating system 132, application programs 134, other program modules 136, and program data 138. Note that these components can either be the same as or different from additional operating systems, application programs, other program modules, and program data, for example, different copies of any of the elements. A user may enter commands and information into the computer 146 through input devices such as a keyboard 140 and pointing device 142, commonly referred to as a mouse, trackball or touch pad. Other input devices (not shown) may include a microphone, joystick, game pad, satellite dish, scanner, or the like. These and other input devices are often connected to the processing unit 104 through a user input interface 144 that is coupled to the system bus, but may be connected by other interface and bus structures, such as a parallel port, game port or a universal serial bus (USB). A monitor 158 or other type of display device is also connected to the system bus 108 via an interface, such as a video interface or graphics display interface 156. In addition to the monitor 158, computers may also include other peripheral output devices such as speakers (not shown) and printer (not shown), which may be connected through an output peripheral interface (not shown).

The computer 102 may operate in a networked environment using logical connections to one or more remote computers, such as a remote computer. The remote computer may be a personal computer, a server, a router, a network PC, a peer device or other common network node, and typically includes many or all of the elements described above relative to the computer 102. The logical connections depicted in FIG. 12 include a local area network (LAN) 148 and a wide area network (WAN) 150, but may also include other networks. Such networking environments are commonplace in offices, enterprise-wide computer networks, intranets and the Internet.

When used in a LAN networking environment, the computer 102 is connected to the LAN 148 through a network interface or adapter 152. When used in a WAN networking environment, the computer 102 typically includes a modem 154 or other means for establishing communications over the WAN 150, such as the Internet. The modem 154, which may be internal or external, may be connected to the system bus 108 via the user input interface 144, or other appropriate mechanism. In a networked environment, program modules depicted relative to the computer 102, or portions thereof, may be stored in the remote memory storage device. By way of example, and not limitation, remote application programs may reside on a memory device. It will be appreciated that the network connections shown are exemplary and other means of establishing a communications link between the computers may be used.

A method and system for providing lighting or illumination effects to an environment in an image is described. The image may include a 3-dimensional computer image of an environment and may include any type of object or entity under various lighting conditions or object configurations. Lighting present in the scene may produce any number or type of shadows of objects or other entities within the environment. Such lighting may strike an object directly to form a corresponding shadow of the object or may reflect off a surface to strike an object as an indirect light. Differing effects of direct or indirect lighting or distance of a light source from an object or changes in object conformation may also be determined and produced in the environment. Global illumination effects may be rendered in a computer graphics illustration or image to enhance a 3-dimensional computer image in a realistic manner, for example.

In one example, an object may be located within the scene, become deformed in a scene, or may be moving dynamically within a scene. In addition, a light source, either movable, deformable, or stationary, may be present such that light may be provided from the light source to the object in the scene. A shadow field may be determined for the object in relation to the light source that represents the shadowing effects of the object based on the incident light from the light source. In addition, the light source may be re-configurable such that the light may be modified. Such a modifiable light source may provide varying or changeable shadow effects in the scene.

The light source contains a field defined at predetermined distances from the light source that represents a source radiance field (SRF). The SRF represents a field associated with the light source that describes the radiance received from the light source at any point in the field. Any number of points within the SRF may be selected for determination of the incident radiance at that point in the field. In addition, any number of SRFs may be used at different radial distances from the light source. FIGS. 1A and 1B illustrate an example of a light source and corresponding source radiance fields (SRF). As FIG. 1A illustrates, a light source 101 or illuminant (stationary or moving) is provided that emits a light. The light source 101 may be located within a computer generated scene or may be located outside of the scene with light effects projecting into the scene.

Also illustrated in FIG. 1A is a source radiance field (SRF). Any number of SRFs may be used. In the example of FIG. 1A, multiple SRFs are defined at different distances from the light source 101. The light source may be in motion or may be re-configurable such that the corresponding SRFs may move or be otherwise modified with alterations in the light source. Also, the SRFs may retain the respective predetermined distances from the light source as the light source is modified. Also in this example, each of the SRFs forms a spherical field around the light source 101. On any of the SRFs, a point may be sampled for determination of incident radiance at that point. In FIG. 1A, point 102 is selected on an SRF and the radiance is determined. FIG. 1B illustrates a representation of the radiance determined to be received at point 102. As this example illustrates, the radiance may further be represented as a cube map at the sampled point in space.

In addition, objects or entities in the scene or environment may have an associated object occlusion field (OOF). The OOF may represent the lack of radiance at a point located a predetermined distance from the object or entity in the scene. Such a lack of illumination or radiance at a point on the OOF may be a result of the occlusion of light from a light source by the object in the scene. For example, incident light may strike the object on one aspect of the object to cause a resulting shadow field on an opposite side of the object. A sampled point selected on a corresponding OOF for the object may contain a representation of the shadow field resulting from the occlusion of light by the object at a point a predetermined distance from the object.

FIG. 2A illustrates an example of an object occlusion field (OOF) associated with an object in a scene. Any number of OOFs may be associated with an object 201 located at any predetermined distance from the object 201. An OOF may represent a spherical field surrounding the object 201 at a predetermined distance on which any number of points may be sampled. The occlusion of radiance or light at each of the selected sampled points may be determined. Also, the occlusion data at the sampled points may be represented in a cube map. FIG. 2A illustrates an example in which a point is sampled on an OOF associated with an object 201. FIG. 2B illustrates a cube map representation of the radiance occlusion at the sampled point.

Global illumination, including shadow fields created from light sources on objects or object occlusion fields associated with an object in a scene may be enhanced by representing features of the scene or objects in the scene, such as radiance and surface reflectance, as spherical harmonics projections. In one example, spherical harmonics scaling is performed by extrapolating visibility and/or radiance functions from a sample point to other points of varying distances from a light source, an object in a scene, or other object or entity affecting the application of light in the scene.

Figures 3A, 3B, 3C:
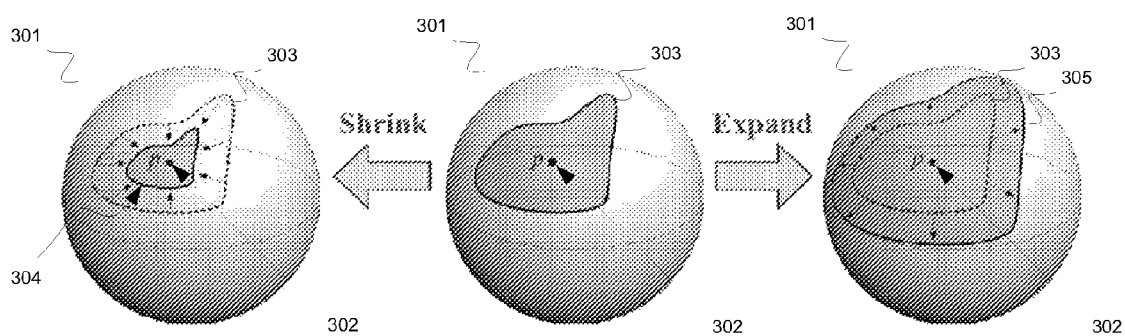
FIGS. 3A-C illustrate an example of scaling of a spherical function.
Figures 3D, 3E, 3F:
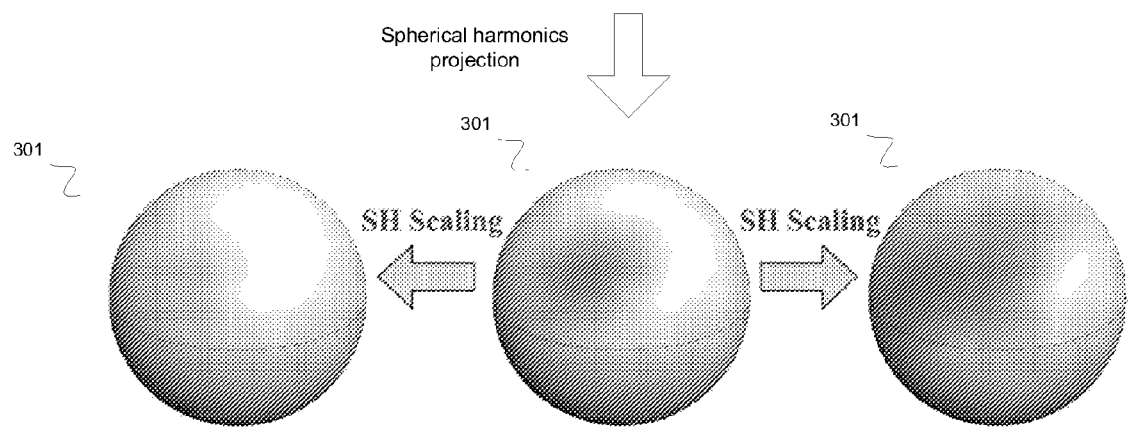
FIGS. 3D-F illustrate an example of scaling of a spherical harmonics projection around point on an entity.

As one example, global illumination of a rendered scene may be achieved by modifying a spherical harmonics (SH) function projected around a given point on any object or entity in the scene. Any modification may be performed on the SH function such as, for example, scaling (e.g., expanding or shrinking) the spherical function with respect to a given point on an object or entity in the scene. FIGS. 3A-3C illustrate an example of scaling a spherical function about a point P 302 on a sphere 301. FIGS. 3D-3F illustrate one example of scaling a spherical harmonics (SH) function.

FIG. 3A illustrates a sphere 301 with a point P 302 around which a spherical function is provided. The spherical function in this example is scaled with respect to point P 302 as illustrated in FIGS. 3B and 3C. As FIG. 3A illustrates, a spherical function creates a region 303 around point P 302. FIG. 3B illustrates scaling of the spherical function to a size that is smaller than the input function of FIG. 3A. In FIG. 3B, a boundary of the spherical function region contracts around point P 302 such that the boundary of the scaled region 304 is closer to point P 302 and the region encompassed by the modified region is shrunken. FIG. 3C illustrates an example of enlarging or expanding the boundary of the spherical function region around point P 302. In this example, the boundary of the spherical function is expanded (305) around point P 302 such that the boundary is farther away from point P 302 after the expansion.

Figure 4A:
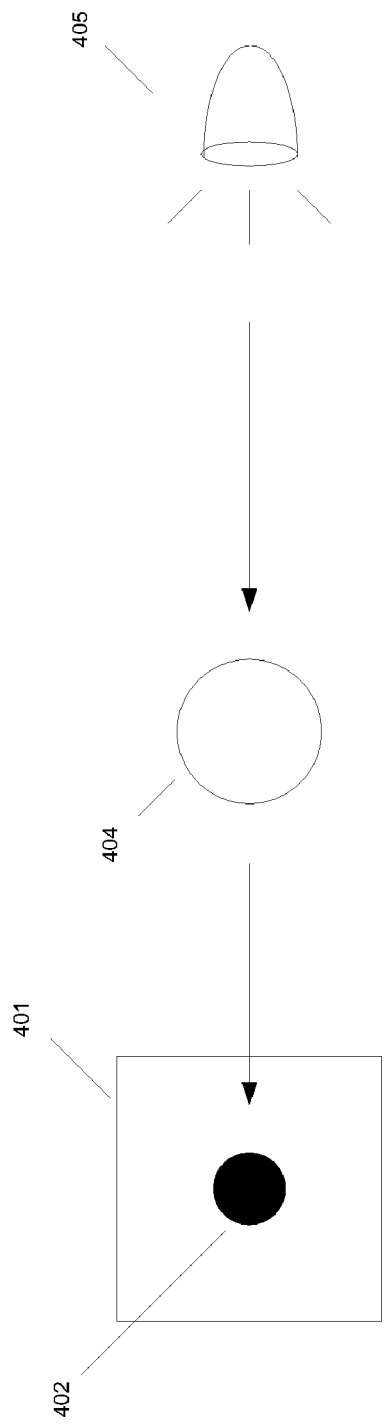
FIGS. 4A and 4B illustrate one example of visibility of a shadow field of an occluder or object in an environment.
Figure 4B:
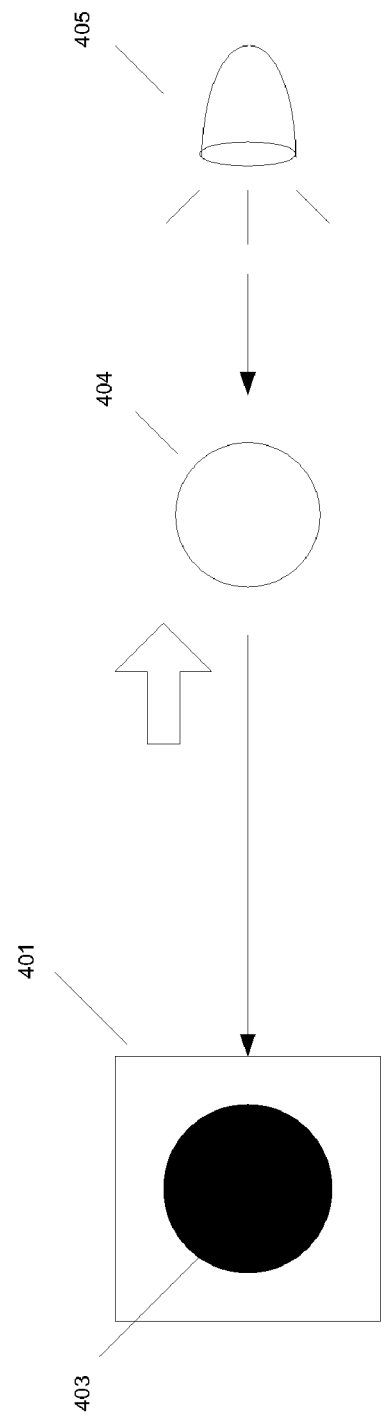

As an occluder or object in a scene is moved to a more distant location with respect to a corresponding shadow on a surface, the shadow may increase in size. Conversely, as an occluding object in a scene is moved closer to a surface, a shadow cast on the surface would be expected to decrease in size. FIG. 4A illustrates an example of an occluding object 404 interposed between a light source 405 and a surface 401. A shadow 402 corresponding to the occluding object 404 is cast on the surface 401. FIG. 4B illustrates the example of FIG. 4A after the occluding object 404 has been moved away from the surface 401. The shadow 403 cast by the occluding object 404 has increased in size responsive to moving the occluding object 404 away from the surface 401 and toward the light source 405. This illustrates the concept of alteration of the size of a shadow based on relative positioning of an occluding object to a surface on which a shadow of the occluding object is cast.

In FIG. 3A, a shadow field on the sphere 301 may correspond to the spherical function 303. The spherical function may further be pre-calculated for different shadow sizes. The varying shadow sizes may be based on relative distances of objects or other entities causing the shadow, as illustrated in the examples of FIGS. 4A and 4B. In this example, the shadow field in FIG. 3B corresponding to a shrunken spherical function of FIG. 3A and the shadow field in FIG. 3C corresponding to an enlarged spherical function of FIG. 3C may each be pre-calculated and may further be stored. Based on relative positioning of objects or other characteristics of a scene at run-time, a corresponding pre-calculated spherical function may be applied to determine a corresponding shadow field.

For example, the spherical function of FIG. 3A may be represented by the following formula in polar coordinates:

$$F_r(\theta,\phi) \tag{Eq. 1}$$

The spherical function in this example contains a parameter representing an axis around which the function may be modified (e.g., shrinking or expanding) represented by $\theta=0$. A new or modified spherical function around the $\theta$ axis may be expressed as:

$$F_d(\theta,\phi) = F_r(\tau(\theta),\phi) \tag{Eq. 2}$$

Where $\tau(\cdot)$ comprises a monotonically increasing angular scaling function that may rescale the polar angle $\theta$ independently of an azimuth angle $\phi$.

As a further example, FIG. 3B illustrates an example in which the spherical function is modified around point P 302 to approximately one-half the size of the region illustrated in FIG. 3A. Hence, in this example, if the spherical function of FIG. 3A corresponds to $F_r$ of equation 1, then the modified spherical function as illustrated in FIG. 3B may be expressed as follows:

$$F_d(\theta,\phi) = F_r((\theta/2),\phi) \tag{Eq. 3}$$

In FIG. 3C, the modified spherical function is expanded around point P 302 to approximately double the size of the region illustrated in FIG. 3A. Hence, in the example illustrated in FIG. 3C, the modified spherical function may be expressed as follows:

$$F_d(\theta,\phi) = F_r(2\theta,\phi) \tag{Eq. 4}$$

The spherical function may further describe any aspect of the lighting effects at a given point. For example, the spherical function may represent visibility of a shadow field or radiance of incident light, to name a few. In one example, energy preservation may be applied to solid angles in scaling of the spherical function. For example, for spherical functions representing radiance (e.g., of a light source), energy preservation may be applied such that a modified spherical function may be expressed as follows:

$$F_d(\theta,\phi)\sin\theta d\theta d\phi = F_r(\tau(\theta),\phi)\sin\tau(\theta)d\tau(\theta)d\phi \tag{Eq. 5}$$
$$= F_r(\tau(\theta),\phi)\sin\tau(\theta)\tau'(\theta)d\theta d\phi$$

Thus, spherical scaling may be defined as follows:

$$F_d(\theta,\phi)\sin\theta d\theta d\phi = F_r(\tau(\theta),\phi)\eta(\theta)d\theta d\phi \tag{Eq. 6}$$

where $\eta(\theta)=\sin\theta$ without energy preservation (e.g., for visibility spherical functions) and $\eta(\theta)=\sin\tau(\theta)\tau'(\theta)$ with energy preservation (e.g., for irradiance spherical functions). For example, for spherical functions representing visibility (e.g., of an object in a scene), the spherical scaling may be represented without energy preservation.

In one example, a spherical function is represented by spherical harmonics coefficients and scaling of the spherical function is performed in a spherical harmonics domain. FIGS. 3D-3F illustrate an example of a spherical harmonics projection of a spherical function and spherical harmonics scaling in which spherical scaling may be performed in the spherical harmonics domain. Hence, in this example, spherical scaling is computed on a spherical harmonics projection.

In this example, spherical functions may be represented by vectors of spherical harmonics coefficients. For example, for an input spherical function of $F_r(\theta,\phi)$ and an output, modified or scaled spherical function of $F_d(\theta,\phi)$, each of the spherical functions may be expressed as vectors of spherical harmonics coefficients, e.g., $S_r$ and $S_d$, respectively. Further, $S_d$ may be expressed as a linear transformation of $S_r$ and with respect to spherical harmonics basis functions $\psi$ as follows:

$$\begin{aligned}S_d(i) &= \int\int_\Omega F_d(\theta,\phi)\psi_i(\theta,\phi)\eta(\theta)d\theta d\phi \\ &= \int\int_\Omega F_r(\tau(\theta),\phi)\psi_i(\theta,\phi)\eta(\theta)d\theta d\phi \\ &= \int\int_\Omega \left(\sum_{j\in I}\psi_j(\tau(\theta),\phi)S_r(j)\right)\psi_i(\theta,\phi)\eta(\theta)d\theta d\phi \\ &= \sum_j\left(S_r(j)\int\int_\Omega \psi_j(\tau(\theta),\phi)\psi_i(\theta,\phi)\eta(\theta)d\theta d\phi\right) \\ &= \sum_j (S_r(j)\cdot M_{i,j})\end{aligned} \tag{Eq. 7}$$

Which may be reduced for a given angular scaling function $\tau(\cdot)$ to the following:

$$S_d = M\cdot S_r^T, \tag{Eq. 8}$$

Where $M_{i,j}$ is an SH scaling transformation matrix and may further be represented as follows:

$$M_{i,j} = \int\int_\Omega \psi_j(\tau(\theta),\phi)\cdot\psi_i(\theta,\phi)\eta(\theta)d\theta d\phi \tag{Eq. 9}$$

Figure 5:
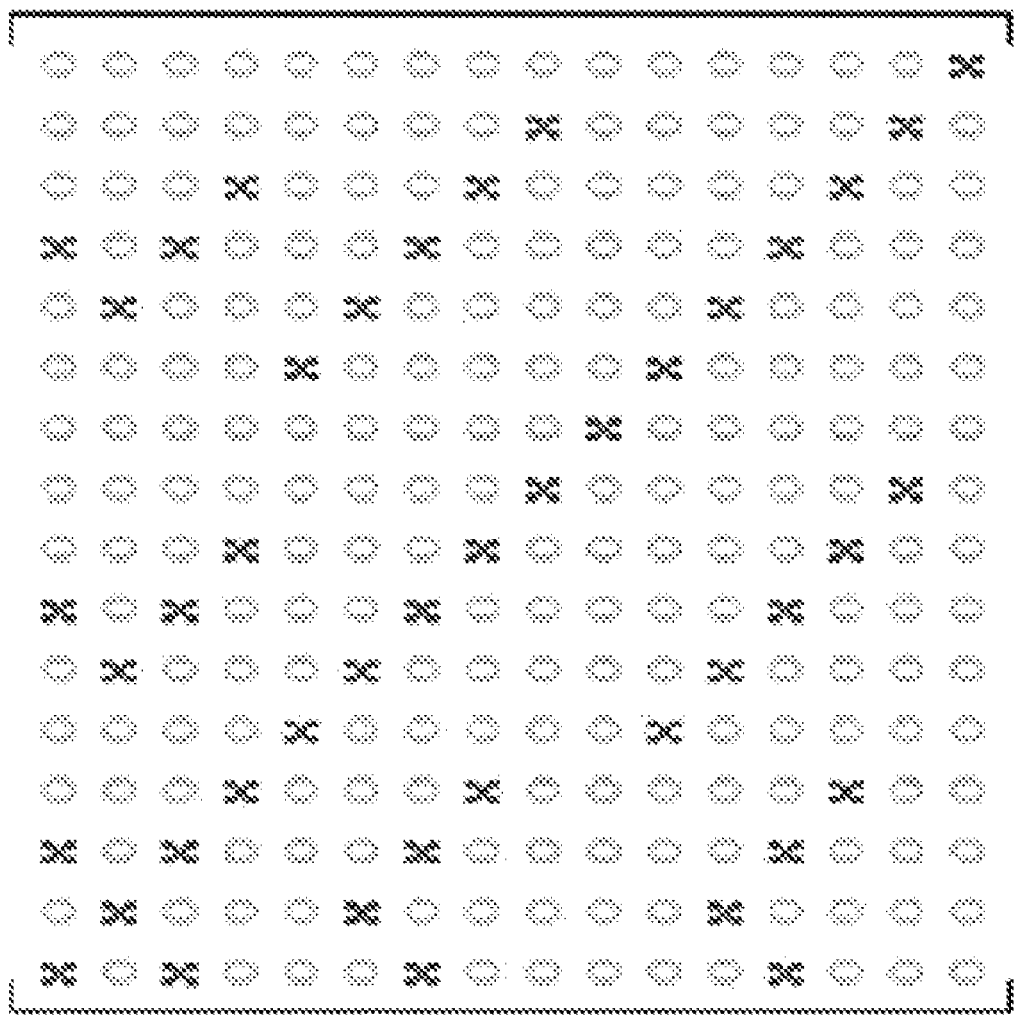
FIG. 5 illustrates an example of a scaling transformation matrix.

FIG. 5 illustrates one example of an SH scaling transformation matrix containing zero elements and non-zero elements. In this example, the locations and positions of the non-zero elements in the matrix are independent of the angular scaling function. Thus, the matrix-vector product of equation 8 above may be further reduced to a set of multiplications and sums for only the non-zero elements.

Also, in one example, less than one-fifth of the total elements in the SH scaling transformation matrix are non-zero elements (i.e., greater than four-fifths of the total elements in the SH scaling transformation matrix are zero elements). As the example of FIG. 5 illustrates, for an $N^{th}$-order spherical harmonics representation, the corresponding SH scaling transformation matrix contains $N^4$ elements. Of the $N^4$ elements in the SH scaling transformation matrix, $N(2N^2+1)/3$ of the total number of elements are non-zero elements. FIG. 5 illustrates an example of a $4^{th}$-order spherical harmonics representation of an SH scaling transformation matrix. In this example, there are a total of 256 elements in the matrix (i.e., $4^4$). Of the 256 elements, forty-four elements are non-zero elements (i.e., $4*(2*(4)^2+1)/3=44$).

Figure 6:
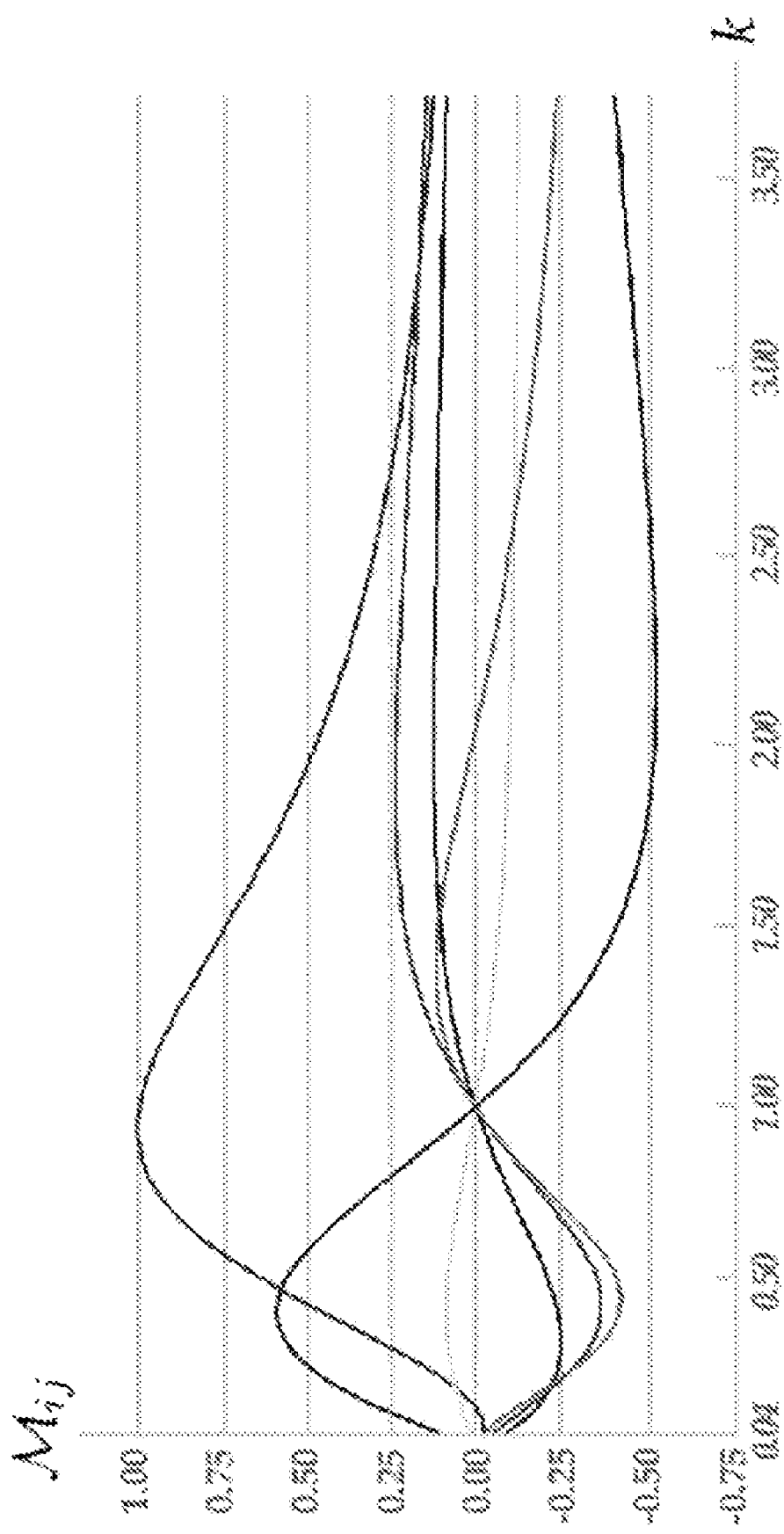
FIG. 6 illustrates an example of six elements in a SH scaling transformation matrix $M_k$ with respect to the parameter k for scaling visibility functions.

Multiple angular scaling functions may be utilized in determining shadow fields of an object or entity in a scene. In one example of multiple angular scaling functions, a series of angular scaling functions may be parameterized by k to provide scaling over a multitude of instances. Each of the parameterized angular scaling functions may have a corresponding scaling transformation matrix. In one example, as illustrated in FIG. 6, numerical values for parameterized SH scaling matrices change smoothly with respect to k.

Spherical scaling in the spherical harmonics domain (e.g., spherical harmonics scaling) may be performed on any type of object, entity or scene. In one example to illustrate, spherical harmonics scaling may be performed to generate shadow fields of a deformable object.

Figure 7:
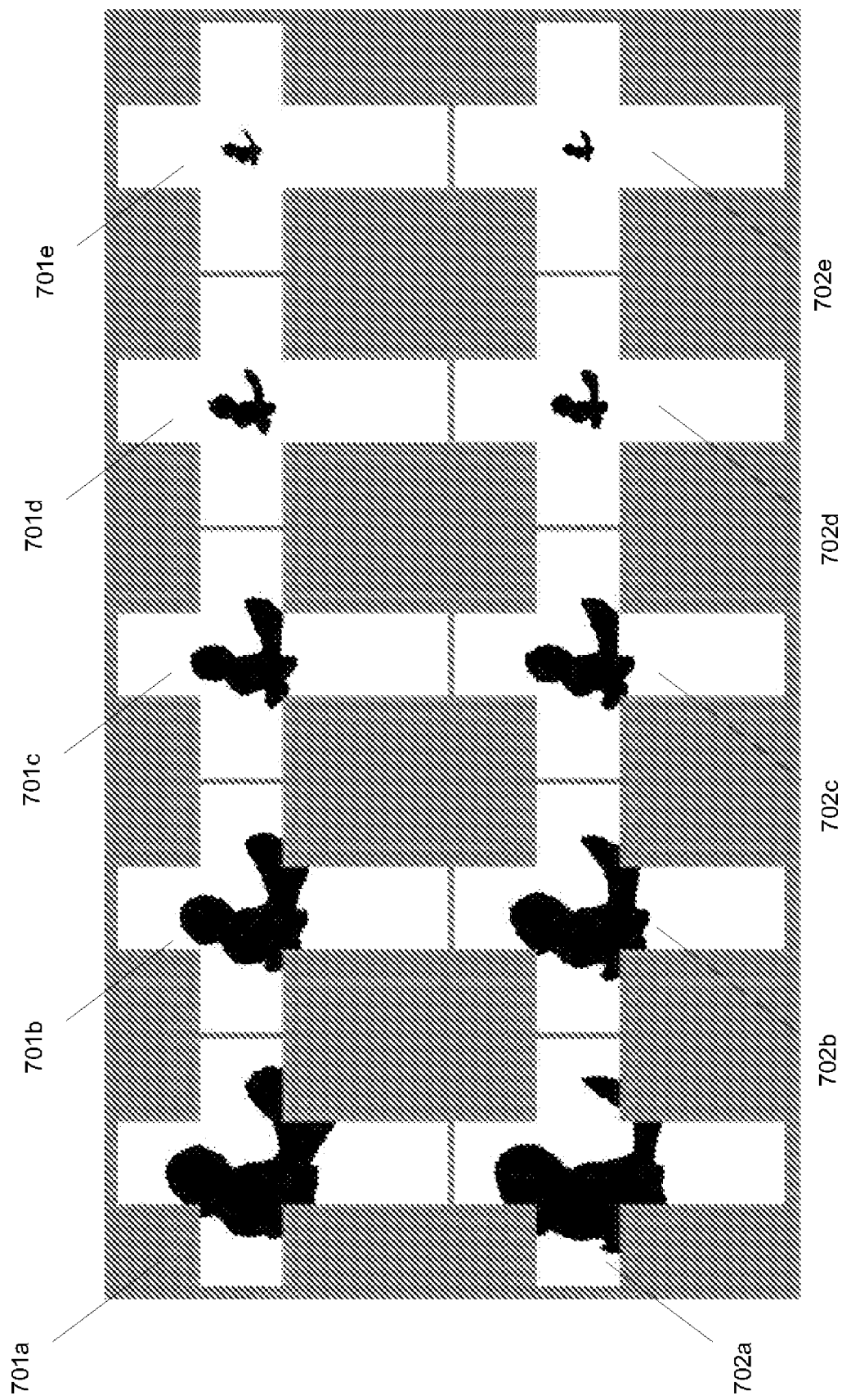
FIG. 7 illustrates an example of visibility of an object in a scene at different distances from the object.

FIG. 7 illustrates visibility of an object in a scene at different distances from the object. Shadow fields 701A-701E of the top row of FIG. 7 represent visibility of the object at points in space that are located at increasing distances from the object. Hence, as FIG. 7 illustrates, the shadow fields of the object decrease in size as the distance between the sample points and the object increases. Similarly, the shadow fields of the object increase in size as the distance between the sample points and the object decreases. In this example of determining shadow fields of an object in a scene, the shadow fields and corresponding visibility of the object in the scene may be determined at a point in space located at a predetermined distance from the object and subsequently the shadow fields may be determined at points located at different distances from the object by extrapolation of spherical harmonics scaling in real-time.

Figure 8:
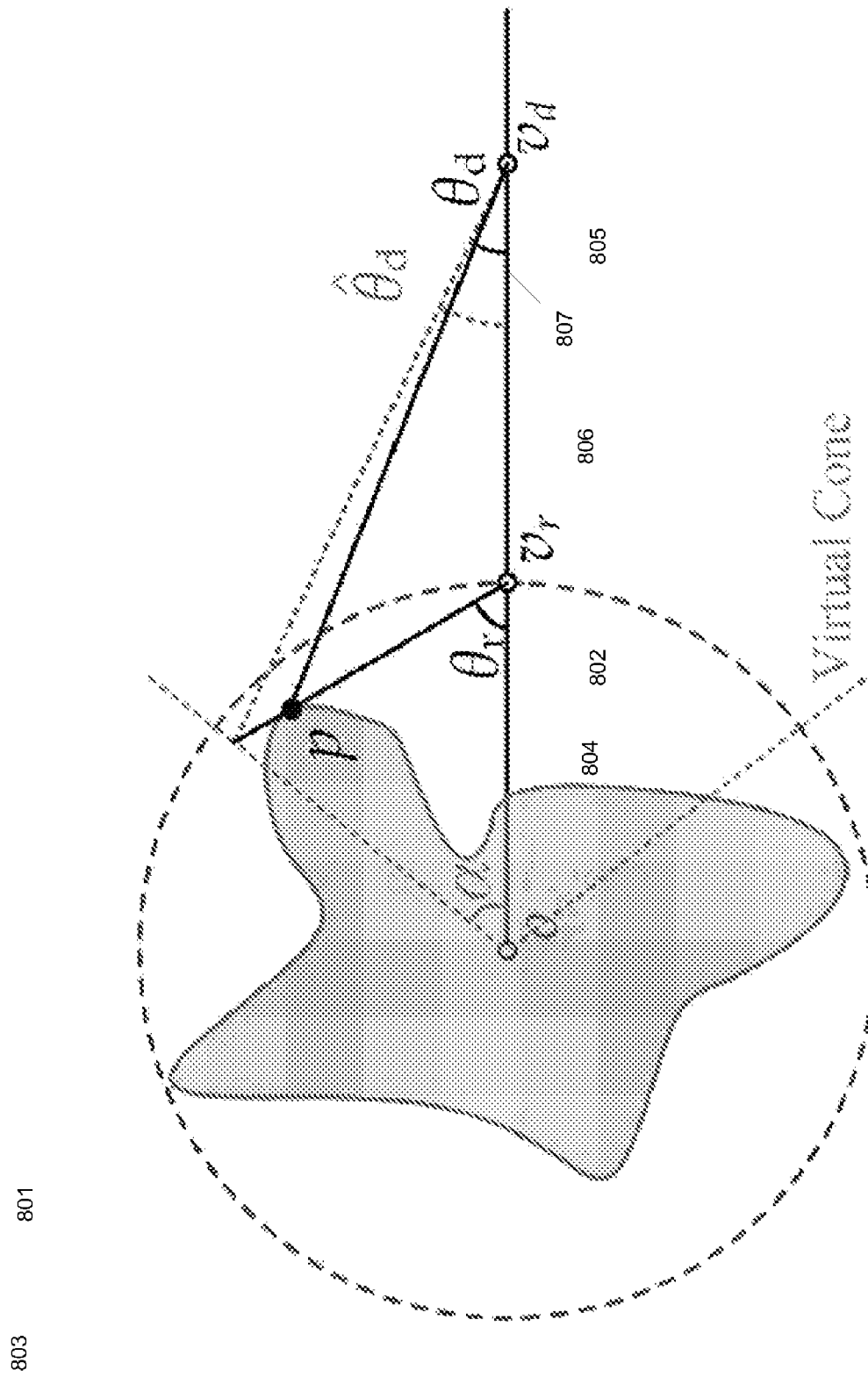
FIG. 8 illustrates an example of approximating shadow field data at a point in space.

Extrapolation of shadow fields from one calculated point to another point in space at a different radii from the object may be accomplished in a variety of ways. FIG. 8 illustrates one example of extrapolation of illumination data from one point using cone geometric approximation. As FIG. 8 illustrates, shadow field data at one point in space located a distance from an object is determined by extrapolating from a sampled point at an OOF and at a different radial distance from the object. In this example of cone geometric approximation, a cone-shaped field is applied to a silhouette of an object to determine a geometric approximation of a shadow field of the object. As FIG. 8 demonstrates, a cone-shaped field is depicted from the object silhouette 801 and facing the sample point 802. The sample point 802 in this example is further located at a predetermined radial distance 804 from the object silhouette 801 on a bounding spherical field (i.e., the OOF 803). The cone-shaped field forms an angle ($\alpha$) from the radial direction between the object silhouette 801 and the sample point 802. The angle may be adjusted to any desired value for approximation of a shadow field of a given object.

The sample point 802 is represented by $v_r$ in FIG. 8 and may be further characterized with an axis of $\theta_r$. The axis represents the angle of the radial axis and an axis from the sample point 802 to the object silhouette 801. Also illustrated in FIG. 8, the visibility of the object 801 at the point $v_r$ may further be extrapolated to a second point 805 (point $v_d$) at a different radial distance 806 from the object. Point $v_d$ 805 may be characterized with an axis of $\theta_d$ 807 to the object silhouette 801 as illustrated in FIG. 8. A visibility function may be determined or approximated by extrapolation from sampled point $v_r$ 802 to any other point such as $v_d$ 805 via a geometric approximation based on an angular scaling function $\tau_k$ from $\theta_d$ to $\theta_r$ as follows:

$$\theta_r = \tau_k(\theta_d) = \theta' \quad \theta' \geq 0$$
$$= \theta' + \pi \quad \theta' < 0$$

Where $$\theta' = \arctan\left(\frac{k\tan\theta}{1 + \tan\theta - k\tan\theta}\right),$$

$(k = d/r)$

In another example, the angle $\theta_d$ may be approximated by adjusting or setting the angle of the cone-shaped field (i.e., angle $\alpha$). In one example, the angle may be set to $\pi/4$ to obtain angle $\hat{\theta}_d$, however the angle may be set to any appropriate value based on the configuration of the object or object silhouette.

Returning to FIG. 7, approximated visibility functions are represented in the second row (i.e., shadow fields 702A-702E) which each correspond to actual visibility at different radii illustrated as 701A-701E. As FIG. 7 illustrates, the computed visibility approximates the actual visibility at different radii. OOFs of occluding objects or entities in a scene may be determined by applying the SH scaling function as set forth in equation 2 above. Similarly, SRFs of light sources may be approximated by applying an energy preserving SH scaling function as set forth in equation 5 above.

Figure 11:
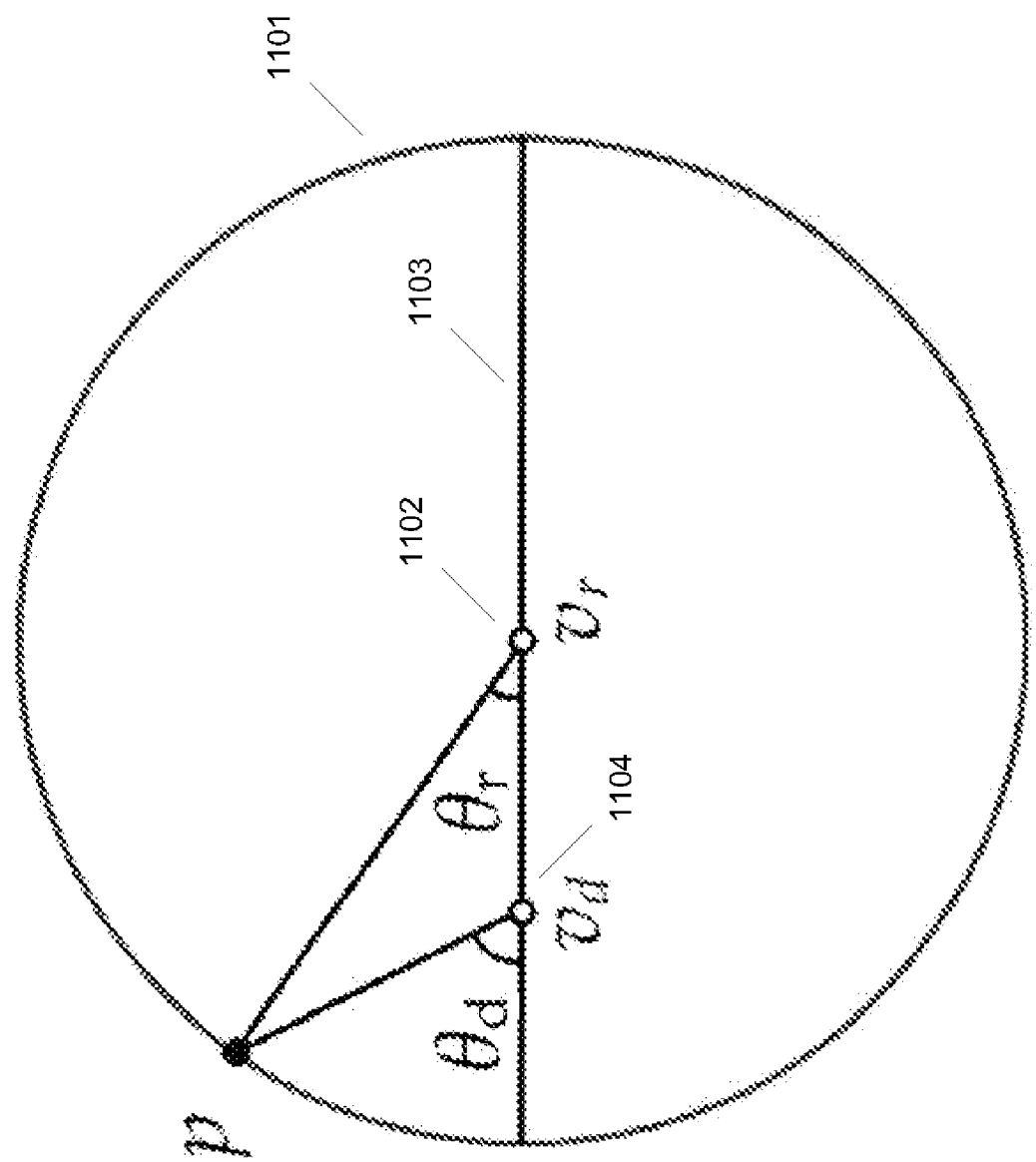
FIG. 11 illustrates another example of scaling of a radiance function.

In another example, SH spherical harmonics scaling may be applied to mid-range environment lighting. In this example, light may originate from a sphere of radius R for environment map illumination and a radiance function (e.g., $F_r(\theta,\phi)$) is captured at the center of the sphere. If the center of the sphere is $v_r$, the radiance function at additional points may be determined from the radiance function at the center of the sphere by scaling the radiance function at the center of the sphere accordingly. FIG. 11 illustrates an example of scaling of a radiance function. As FIG. 11 illustrates, a sphere 1101 of radius R (1103) describes illumination of light emanating from center point $v_r$ (1102). A single radiance function at the center point 1102 may be determined and scaled to determine a radiance function at another location in the sphere (e.g., point 1104). The radiance function at the other location may be expressed as $F_d(\theta,\phi)$. In this example, a vector based on the radiance function $F_r(\theta,\phi)$ from the center point 1102 forms an angle $\theta_r$ which corresponds to an angle $\theta_d$ of the radiance function at the other location in the sphere ($v_d$ 1104 as illustrated in FIG. 11). If a vector connecting $v_r$ to $v_d$ is expressed as a signed quantity d, the angular scaling function $\tau_k$ may be given as follows:

$$\theta_r = \tau_k(\theta_d) = 2\arctan\left(\frac{\sqrt{\cot^2\theta_d + 1 - k^2} - \cot\theta_d}{1 + k}\right), k = d/R \in (-1, 1)$$

Figure 9:
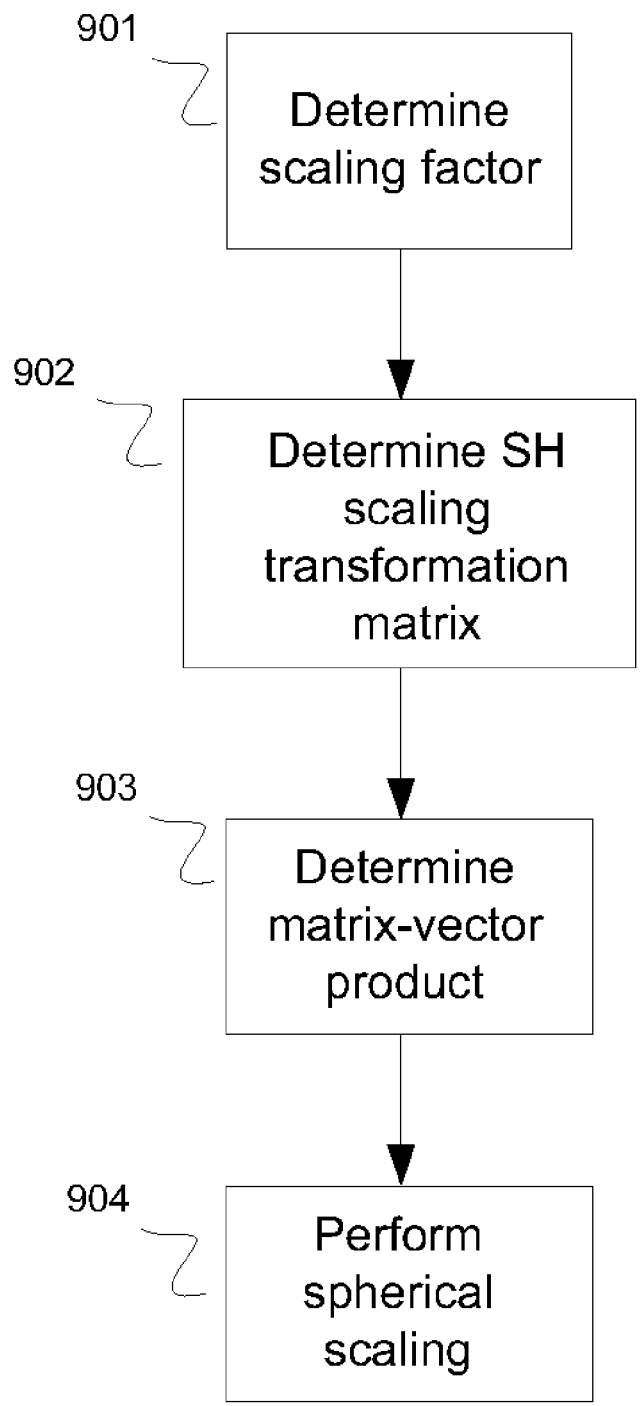
FIG. 9 is a flowchart illustrating one example of a method for modifying a spherical harmonics function.

FIG. 9 is a flowchart illustrating one example of a method for modifying a spherical harmonics function for determination of an illumination of an object in a scene. In STEP 901, a scaling factor is determined. This scaling factor may include an angular scaling function for modifying or scaling an angle associated with a spherical function or corresponding spherical harmonics coefficients. In one example, the scaling factor may be based on a relative distance of an occluding object in a scene and a shadow field associated with the occluding object.

In STEP 902, a spherical harmonics scaling transformation matrix is determined. The matrix may include any number of elements and may include zero elements and/or non-zero elements. The total number of elements in the matrix may vary based on the functions. In one example, the total number of elements in the matrix that is substantially proportional to the order of the spherical harmonics representation. For example, a $4^{th}$ order spherical harmonics representation may have an associated matrix containing a total number of elements that is greater than a $3^{rd}$ order spherical harmonics representation. In one example, the total number of elements in a spherical harmonics scaling transformation matrix is substantially equal to $N^4$ for an Nth-order spherical harmonics representation.

In addition, the spherical harmonics scaling transformation matrix may contain any number of zero elements and any number of non-zero elements. In one example, the number of non-zero elements may be based on the order of the spherical harmonics representation. For example, the number of non-zero elements in the spherical harmonics scaling transformation matrix may be substantially equal to $N(2N^2+1)/3$ for an Nth-order spherical harmonics representation.

Non-zero elements may be located at any location in the spherical harmonics scaling transformation matrix. In one example, placement or location of the non-zero elements in the spherical harmonics scaling transformation matrix is independent of the angular scaling function.

In yet another example, the spherical harmonics scaling transformation matrix may be represented as follows:

$$M_{i,j} = \int\int_\Omega \psi_j(\tau(\theta),\phi) \cdot \psi_i(\theta,\phi) \eta(\theta) d\theta d\phi \quad \text{(Eq. 9)}$$

In STEP 903, a matrix-vector product may be determined. The matrix-vector product may be based on the spherical harmonics scaling transformation matrix and a corresponding spherical harmonics coefficient associated with a spherical function. The spherical function may be represented by the corresponding spherical harmonics coefficients. For example, a spherical function may be represented by a vector of spherical harmonics coefficients. The vectors may further be expressed with respect to spherical harmonics basis functions. In one example, the matrix-vector product may include the following:

$$S_d = M \cdot S_r^T,$$

Where $S_r$ represents a vector of spherical harmonics coefficients corresponding to a non-scaled spherical function and $S_d$ represents a vector of spherical harmonics coefficients corresponding to modified (or scaled) spherical harmonics coefficients in the spherical harmonics domain. Based on the matrix-vector product, a spherical function represented by spherical harmonics coefficients in the spherical harmonics domain may be scaled in real-time (STEP 904). Hence, in this example, scaling of spherical functions need not be pre-computed.

Figure 10:
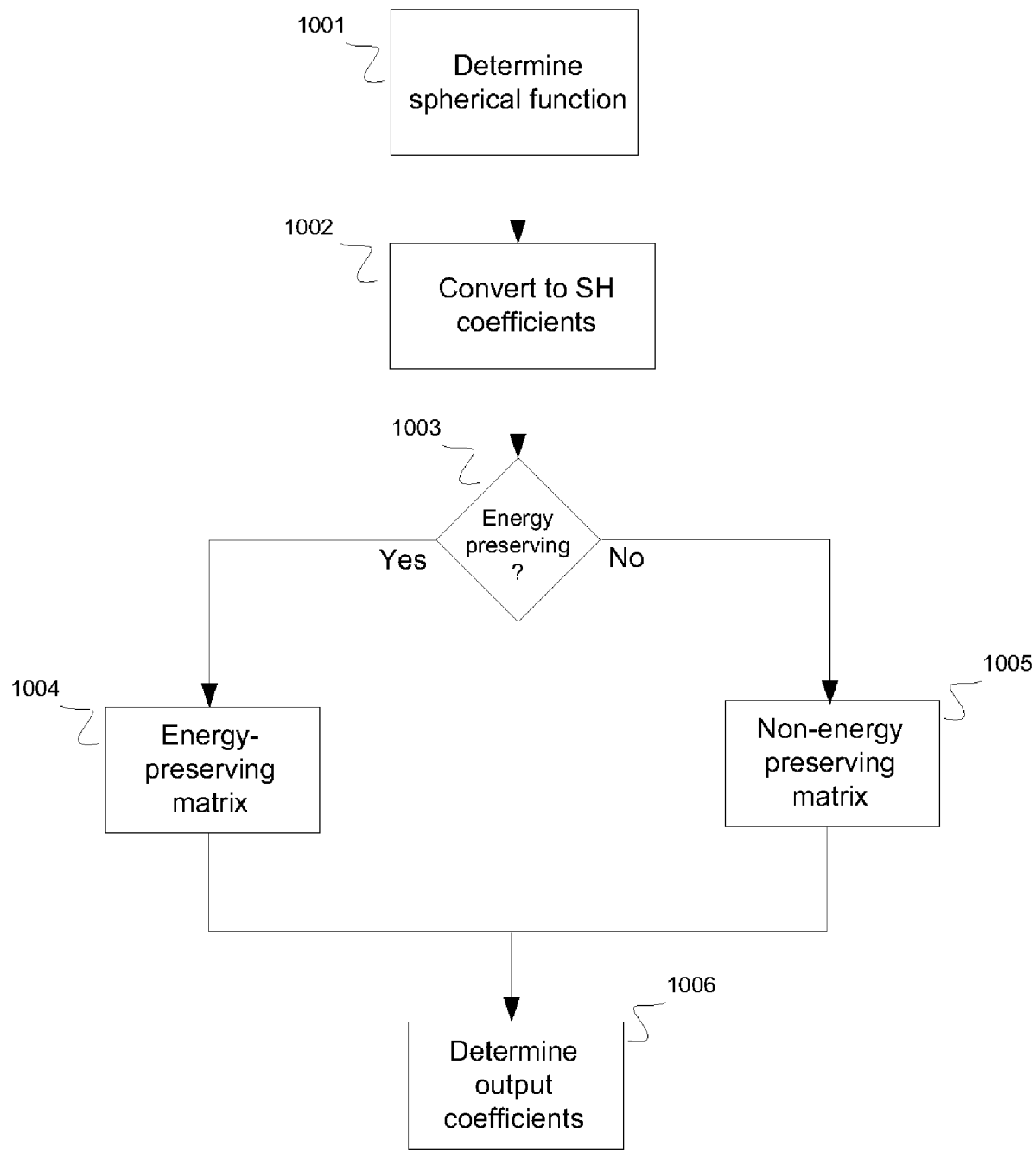
FIG. 10 illustrates one example of scaling of a spherical function in a spherical harmonics domain.

FIG. 10 is a flowchart illustrating another example of spherical harmonics scaling of a spherical function in a spherical harmonics domain. In STEP 1001, a spherical function is determined. The spherical function may be associated with a point in space or on a surface in a scene. The spherical function may correspond to a shadow field or a radiance field in a scene. The spherical function in this example may further be scaled to a different size directly in a spherical harmonics domain.

In STEP 1002, the spherical function is converted to spherical harmonics coefficients. In this example, the converted spherical function may be represented by vectors of spherical harmonics coefficients. For example, the vectors of spherical harmonics coefficients may include $S_r$ which may represent the spherical function in the spherical harmonics domain. Also, a vector $S_d$ may represent a vector of spherical harmonics coefficients of a scaled or resized spherical function in the spherical harmonics domain.

In STEP 1003, a determination is made whether energy preservation is desired. Energy preservation may be desired in certain cases but may be optional in other cases. For example, of the spherical function is a radiance function associated with a light source, energy preservation may be desired. If energy preservation is desired ("Yes" branch of STEP 1003), then an energy-preserving spherical harmonics scaling transformation matrix may be determined in STEP 1004. As one example of an energy-preserving matrix, the matrix may correspond to equation 9 wherein $\eta(\theta) = \sin \tau(\theta) \tau'(\theta)$.

Alternatively, if energy preservation is not desired ("No" branch of STEP 1003), then in STEP 1005, a non-energy preserving spherical harmonics scaling transformation matrix is determined. As one example of a non-energy preserving matrix, the matrix may correspond to equation 9 wherein $\eta(\theta) = \sin \theta$.

In STEP 1006, output spherical harmonics coefficients may be determined based on the corresponding spherical harmonics scaling transformation matrix. In this example, a matrix-vector product is determined including the spherical harmonics scaling transformation and a vector of spherical harmonics coefficients corresponding to the spherical function. Hence, a scaled spherical function may be determined in real-time directly in the spherical harmonics domain.

In another example, a computer-readable medium having computer-executable instructions stored thereon is provided in which execution of the computer-executable instructions performs a method as described above. The computer-readable medium may be included in a system or computer and may include, for example, a hard disk, a magnetic disk, an optical disk, a CD-ROM, etc. A computer-readable medium may also include any type of computer-readable storage media that can store data that is accessible by computer such as random access memories (RAMs), read only memories (ROMs), and the like.

It is understood that aspects of the present invention can take many forms and embodiments. The embodiments shown herein are intended to illustrate rather than to limit the invention, it being appreciated that variations may be made without departing from the spirit of the scope of the invention. Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

The invention claimed is:

1. A method for scaling a spherical harmonics function, the method comprising:
   storing, in a memory communicatively coupled to a processor, computer-executable instructions for performing the method;
   executing the instructions on the processor;
   according to the instructions being executed:
   receiving spherical function;
   converting the spherical function to a spherical harmonics representation;
   generating a matrix-vector product comprising the spherical harmonics representation based on a spherical harmonics scaling transformation matrix, wherein the matrix-vector product is equivalent to $M \cdot S_r^T$, M being the spherical harmonics scaling transformation matrix and $S_r^T$ being the spherical harmonics representation corresponding to the spherical function, wherein r indicates a radius of the spherical harmonics representation, and T indicates a transpose of S, and wherein M is equal to:

$$\int\int_\Omega \psi_j(\tau(\theta), \phi) \cdot \psi_i(\theta, \phi)\eta(\theta)d\theta d\phi,$$

$\tau(\theta)$ being an angular scaling function, $\eta(\theta)$ being an energy preservation parameter, i and j being coordinates of elements within the matrix M, and $\psi$ being a spherical harmonics basis function; and scaling the spherical harmonics representation in a spherical harmonics domain based on the matrix-vector product.

2. The method of claim 1 wherein the spherical harmonics scaling transformation matrix comprises a plurality of zero elements and a plurality of non-zero elements.

3. The method of claim 2 wherein the number of non-zero elements in the spherical harmonics scaling transformation matrix is based on an order of the spherical harmonics representation.

4. The method of claim 3 wherein the number of non-zero elements in the spherical harmonics scaling transformation matrix is equal to $N(2N^2+1)/3$, wherein N is the order of the spherical harmonics representation.

5. The method of claim 1 wherein the spherical harmonics scaling transformation matrix comprises a number of elements proportional to an order of the spherical harmonics representation.

6. The method of claim 1 wherein the spherical harmonics representation includes a vector containing spherical harmonics coefficients.

7. The method of claim 1 wherein $\eta(\theta)$ comprises one of sin $\theta$ and sin $\tau(\theta)\tau'(\theta)$.

8. The method of claim 7 wherein the spherical function is a visibility function and $\eta(\theta)$ comprises sin $\theta$.

9. The method of claim 7 wherein the spherical function is a radiance function and $\eta(\theta)$ comprises sin $\tau(\theta)\tau'(\theta)$.

10. The method of claim 1 wherein the spherical harmonics scaling transformation matrix comprises zero elements and non-zero elements and wherein the scaling includes reducing the matrix-vector product based only on the non-zero elements of the spherical harmonics scaling transformation matrix.

11. A computer-readable medium containing computer-executable code wherein execution of the computer-executable code performs the following steps:
receiving a spherical function and an angular scaling function for rescaling the spherical function;
projecting the spherical function into a spherical harmonics domain, wherein projecting the spherical function includes converting the spherical function to a vector comprising spherical harmonics coefficients; and
scaling the spherical function in the spherical harmonics domain, wherein the spherical function is associated with a region and scaling includes one of shrinking or enlarging the region to generate a scaled region, wherein the scaling includes generating a matrix-vector product based on the vector and a spherical harmonics scaling transformation matrix;
wherein the matrix-vector product is equal to $M \cdot S_r^T$, M being the spherical harmonics scaling transformation matrix and $S_r^T$ being a vector comprising coordinates corresponding to the projected spherical function in the spherical harmonics domain, wherein r indicates a radius of the spherical harmonics representation, and T indicates a transpose of S.

12. The computer-readable medium of claim 11 wherein the spherical harmonics scaling transformation matrix is based on the angular scaling function.

13. The computer-readable medium of claim 11 wherein M is equal to:

$$\int\int_\Omega \psi_j(\tau(\theta), \phi) \cdot \psi_i(\theta, \phi)\eta(\theta)d\theta d\phi,$$

$\tau(\theta)$ being a scaling function, $\eta(\theta)$ being an energy preservation parameter, i and j being coordinates of elements within the matrix M, and $\psi$ being a spherical harmonics basis function.

14. A system for generating global illumination effects in a computer-generated environment, the system comprising:
an input for receiving a spherical function corresponding to an illumination-based area; and
a processor for performing the following steps:
converting the spherical function into a vector comprising spherical harmonics coefficients;
determining a spherical harmonics scaling transformation matrix corresponding to a scaling function;
computing a matrix-vector product comprising the vector and the spherical harmonics scaling transformation matrix; and
scaling the spherical function in a spherical harmonics domain based on the matrix-vector product;
wherein the spherical harmonics scaling transformation matrix is equal to:

$$\int\int_\Omega \psi_j(\tau(\theta), \phi) \cdot \psi_i(\theta, \phi)\eta(\theta)d\theta d\phi,$$

$\tau(\theta)$ is the scaling function, $\eta(\theta)$ is an energy preservation parameter, i and j are coordinates of elements within the spherical harmonics scaling transformation matrix, and $\psi$ is a spherical harmonics basis function.

15. The system of claim 14, wherein:
determining the spherical harmonics scaling transformation matrix corresponding to the scaling function is determined such that:
the spherical harmonics scaling transformation matrix comprises a plurality of zero elements and a plurality of non-zero elements;
the number of non-zero elements in the spherical harmonics scaling transformation matrix is based on an order of the spherical harmonics representation; and
the number of non-zero elements in the spherical harmonics scaling transformation matrix is equal to $N(2N^21)/3$, wherein N is the order of the spherical harmonics representation; and
the matrix-vector product is equivalent to $M \cdot S_r^T$, wherein M is the spherical harmonics scaling transformation matrix and $S_r^T$ is the spherical harmonics representation corresponding to the spherical function, and wherein r indicates a radius of the spherical harmonics representation, and T indicates a transpose of S.

* * * * *